US010911289B1

United States Patent
Strickland et al.

(10) Patent No.: US 10,911,289 B1
(45) Date of Patent: Feb. 2, 2021

(54) INTERFACE TO PROVIDE SELECTABLE TIME DOMAIN OR FREQUENCY DOMAIN INFORMATION TO DOWNSTREAM CIRCUITRY

(71) Applicant: Silicon Laboratories Inc., Austin, TX (US)

(72) Inventors: Ken Strickland, Austin, TX (US); Bradley Arthur Wallace, Austin, TX (US); Carl Alelyunas, Austin, TX (US); Vladimir Mesarovic, Austin, TX (US)

(73) Assignee: SILICON LABORATORIES INC., Austin, TX (US)

( * ) Notice: Subject to any disclaimer, the term of this patent is extended or adjusted under 35 U.S.C. 154(b) by 0 days.

(21) Appl. No.: 16/527,571

(22) Filed: Jul. 31, 2019

(51) Int. Cl.
*H04L 27/14* (2006.01)
*H04L 27/26* (2006.01)
*H04L 25/03* (2006.01)

(52) U.S. Cl.
CPC .... *H04L 27/2649* (2013.01); *H04L 25/03012* (2013.01); *H04L 25/03159* (2013.01); *H04L 27/14* (2013.01); *H04L 27/2671* (2013.01)

(58) Field of Classification Search
CPC .. H04B 7/0845; H04B 7/0857; H04B 7/0885; H04L 27/265; H04L 27/2669; H04L 2025/03414
See application file for complete search history.

(56) References Cited

U.S. PATENT DOCUMENTS

| | | | | |
|---|---|---|---|---|
| 5,768,307 | A * | 6/1998 | Schramm | H04B 1/707 375/150 |
| 10,256,858 | B1 * | 4/2019 | Hakkola | H04B 7/0845 |
| 2007/0142009 | A1 * | 6/2007 | Scarpa | H04B 7/0868 455/132 |
| 2009/0167945 | A1 * | 7/2009 | Tsui | H04B 7/0857 348/552 |
| 2009/0175372 | A1 * | 7/2009 | Moon | H04L 27/2602 375/260 |

(Continued)

OTHER PUBLICATIONS

Silicon Laboratories, "Si47961-62 Data Short, High-Performance Automotive Dual AM/FM Radio Receiver and HD Radio™/DAB/DAB+/DMB/DRM Tuner," 5 pages, Date Unknown.

(Continued)

*Primary Examiner* — Aristocratis Fotakis
(74) *Attorney, Agent, or Firm* — Trop, Pruner & Hu, P.C.

(57) ABSTRACT

In one embodiment, an apparatus includes first and second tuners to receive and process a radio frequency (RF) signal and output a first and second plurality of frequency domain sub-carriers. The apparatus may further include a combiner circuit to combine a first plurality of demodulated frequency domain sub-carriers and a second plurality of demodulated frequency domain sub-carriers into a plurality of combined frequency domain sub-carriers, and an output circuit coupled to the combiner circuit. In a first mode, the output circuit is to embed a format indicator with each of the plurality of combined frequency domain sub-carriers to indicate a frequency domain format, and to output the plurality of combined frequency domain sub-carriers with the embedded format indicator to a downstream processing circuit for channel decoding.

18 Claims, 7 Drawing Sheets

(56) References Cited

U.S. PATENT DOCUMENTS

| | | | | |
|---|---|---|---|---|
| 2010/0255851 | A1* | 10/2010 | Kwak | H04L 5/0007 455/450 |
| 2011/0243209 | A1* | 10/2011 | Oren | H04B 7/0871 375/227 |
| 2012/0063553 | A1* | 3/2012 | Carwana | H04B 7/0857 375/347 |
| 2012/0321012 | A1* | 12/2012 | Elenes | H04B 7/0845 375/285 |
| 2013/0115903 | A1* | 5/2013 | Kroeger | H04B 7/0857 455/193.1 |
| 2013/0136212 | A1* | 5/2013 | Shirasuka | H04N 21/4263 375/340 |
| 2014/0094130 | A1* | 4/2014 | Elenes | H04B 7/0845 455/132 |
| 2015/0063497 | A1* | 3/2015 | Elenes | H04L 27/2649 375/340 |
| 2017/0024183 | A1* | 1/2017 | Li | H04H 20/22 |
| 2020/0014413 | A1* | 1/2020 | Davis | H04B 1/16 |

OTHER PUBLICATIONS

U.S. Appl. No. 16/028,517, filed Jul. 6, 2018, entitled "System, Apparatus and Method for Hardware and Software Support of Radio Functionality," by Shawn Michael Davis, et al.

Silicon Laboratories, "Si47942 Data Short," Preliminary Rev. 0.1, 5 pages, at least as early as Jun. 2018.

Silicon Laboratories, "Si47951-52 Data Short," Preliminary Rev. 0.1, 5 pages, at least as early as Jun. 2018.

Silicon Laboratories, "Si46942 Data Short," Preliminary Rev. 0.1, 5 pages, at least as early as Jun. 2018.

Silicon Laboratories, "Silicon Labs Radio Tuner ICs Drive Software-Defined Radio Solution for Renesas's "R-Car" SoC In-Vehicle Infotainment System," 3 pages, Oct. 31, 2017.

* cited by examiner

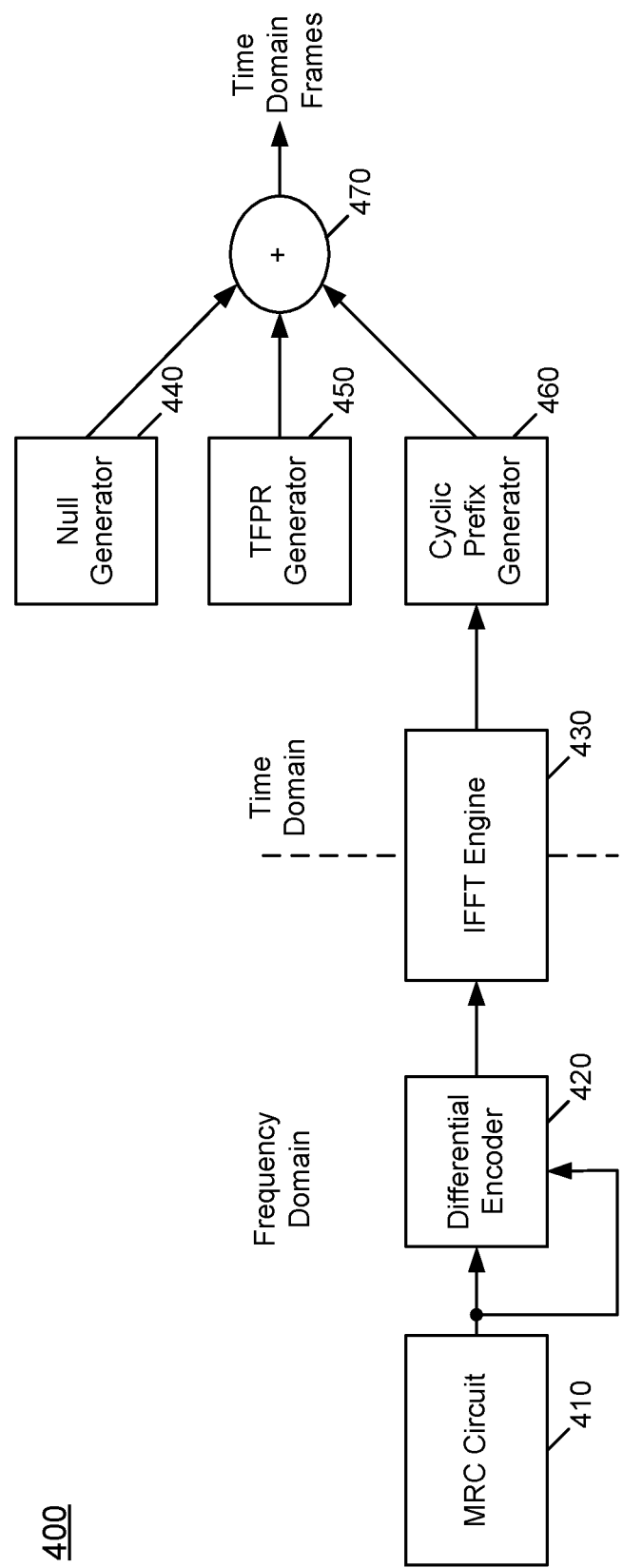

INTERFACE TO PROVIDE SELECTABLE TIME DOMAIN OR FREQUENCY DOMAIN INFORMATION TO DOWNSTREAM CIRCUITRY

BACKGROUND

Radios are pervasive in all types of environments including standalone radios, radios incorporated into consumer electronic devices such as smartphones and so forth, and radios incorporated into other entertainment systems, including vehicle infotainment systems. A variety of different radio formats and bands of operation exist, including conventional analog radios that operate in AM or FM bands. In addition, a number of digital radio formats are available for use in terrestrial communications as well as satellite-based communications. Oftentimes a radio can be segmented into different circuits, e.g., different integrated circuits (IC's) including a tuner IC and a demodulator IC that may further perform additional processing. While such conventional segmentation works well, there is limited flexibility afforded.

SUMMARY OF THE INVENTION

In one aspect, an apparatus includes multiple tuners. A first tuner includes: a first analog front end circuit to receive a radio frequency (RF) signal and downconvert the RF signal to a first lower frequency signal; a first digitizer to digitize the first lower frequency signal into a first digitized first lower frequency signal; a first fast Fourier transform (FFT) engine to compute a first plurality of frequency domain sub-carriers from the first digitized first lower frequency signal; and a first format demodulator to demodulate the first plurality of frequency domain sub-carriers. In turn, a second tuner includes: a second analog front end circuit to receive the RF signal and downconvert the RF signal to a second lower frequency signal; a second digitizer to digitize the second lower frequency signal into a second digitized second lower frequency signal; a second FFT engine to compute a second plurality of frequency domain sub-carriers from the second digitized second lower frequency signal; and a second format demodulator to demodulate the second plurality of frequency domain sub-carriers. The apparatus may further include a combiner circuit to combine the first plurality of demodulated frequency domain sub-carriers and the second plurality of demodulated frequency domain sub-carriers into a plurality of combined frequency domain sub-carriers, and an output circuit coupled to the combiner circuit. In a first mode, the output circuit is to embed a format indicator with each of the plurality of combined frequency domain sub-carriers to indicate a frequency domain format, and to output the plurality of combined frequency domain sub-carriers with the embedded format indicator to a downstream processing circuit for channel decoding.

In an example, the apparatus further comprises a control circuit to control the output circuit to operate in the first mode and to operate in a second mode in which time domain signal information is sent to the downstream processing circuit. The control circuit may control the output circuit to operate in one of the first mode and the second mode based on format information received from a host processor. The apparatus may further include a frequency-to-time converter coupled to the combiner circuit, where in the second mode, the frequency-to-time converter is to convert the plurality of combined frequency domain-sub-carriers into a plurality of combined time domain samples and provide the plurality of combined time domain samples to the output circuit. When the control circuit is to control the output circuit to operate in the first mode, the control circuit is to disable the frequency-to-time converter.

In an example, in the first mode, the first format demodulator is to coherently demodulate the first plurality of frequency domain sub-carriers, and in the second mode the first format demodulator is to non-coherently demodulate the first plurality of frequency domain sub-carriers. The first tuner may include an interface to couple to the downstream processing circuit. The interface may have a plurality of lines including: a first line to communicate a frame clock; a second line to communicate a bit clock; a third line to communicate first complex information with the embedded format indicator; and a fourth line to communicate second complex information with the embedded format indicator. In the first mode the third line is to communicate the first complex information in the frequency domain and in the second mode the third line is to communicate the first complex information in the time domain.

In an example, the apparatus further comprises a bypass path coupled between the combiner circuit and the output circuit, where in the first mode, the bypass path is to provide the plurality of combined frequency domain sub-carriers to the output circuit. The first tuner may further comprise a first synchronizer to synchronize the first digitized first lower frequency signal and provide the synchronized first digitized first lower frequency signal to the first FFT engine. The output circuit is further to embed metadata associated with the RF signal into the plurality of combined frequency domain sub-carriers, the metadata comprising signal metric information regarding the RF signal.

In another aspect, a method comprises: in response to configuration information from a host processor for processing an incoming RF signal of a first DRB format, configuring a multi-tuner IC for a first mode of operation in which the multi-tuner IC is to output frequency domain information to a coprocessor coupled to the multi-tuner IC; receiving, in a first tuner of the multi-tuner IC, the incoming RF signal and processing the incoming RF signal into first frequency domain sample information; receiving, in a second tuner of the multi-tuner IC, the incoming RF signal and processing the incoming RF signal into second frequency domain sample information; combining the first frequency domain sample information and the second frequency domain sample information into combined frequency domain sample information; embedding a format indicator into each of a plurality of sub-carriers of the combined frequency domain sample information to indicate a frequency domain format; and outputting the plurality of sub-carriers of the combined frequency domain sample information having the embedded format indicator from the multi-tuner IC to the coprocessor.

In an example, the method further comprises, in the first mode of operation, disabling a frequency-to-time converter of the multi-tuner IC. The method may further comprise, in a second mode of operation, enabling the frequency-to-time converter and converting the plurality of sub-carriers of the combined frequency domain sample information into a plurality of time domain samples. The method may further comprise: embedding another format indicator into the plurality of time domain samples to indicate a time domain format; and outputting the plurality of time domain samples having the embedded another format indicator from the multi-tuner IC to the coprocessor. In an example, processing the incoming RF signal into the first frequency domain sample information comprises performing coherent demodulation. The method may further comprise embedding signal metric information regarding the incoming RF signal into at least some of the plurality of sub-carriers of the combined frequency domain sample information.

In another aspect, a system includes multiple ICs, including a first integrated circuit comprising a plurality of tuners to receive, downconvert and digitize an incoming RF signal into a first plurality of digital signals, demodulation circuitry to format demodulate the first plurality of digital signals, a first combiner to combine the format demodulated first plurality of digital signals into a first combined digital signal, and an output circuit to output the first combined digital signal in a frequency domain in a first mode and to output the first combined digital signal in a time domain in a second mode. The system may further include a second integrated circuit coupled to the first integrated circuit, that in turn includes a decoder to decode the first combined digital signal and to output decoded audio information to a host processor coupled to the second integrated circuit. The system may further include the host processor coupled to the second integrated circuit.

In an example, the second integrated circuit further comprises a second plurality of tuners to receive, downconvert and digitize the incoming RF signal into a second plurality of digital signals, second demodulation circuitry to format demodulate the second plurality of digital signals, a second combiner to combine the format demodulated second plurality of digital signals into a second combined digital signal, and where the decoder is to decode the second combined digital signal into second decoded audio information. The second integrated circuit further comprises a linker circuit to seamlessly link the decoded audio information and the second decoded audio information and output the seamlessly linked decoded audio information to the host processor.

BRIEF DESCRIPTION OF THE DRAWINGS

FIG. 3 is a block diagram of a data frame in accordance with an embodiment.

FIG. 4 is a block diagram of a converter in accordance with an embodiment.

DETAILED DESCRIPTION

In various embodiments, flexible and dynamically controllable allocation of radio processing operations may occur to partition these operations between different components of a radio system, including multiple integrated circuits. Then depending upon a given mode of operation, these components can be dynamically configured to perform different portions of the overall radio processing. In this way, available processing capacity of various ICs can be flexibly allocated to the different operations, enabling a wide range of options for incorporating components into a radio system for processing many different formats of radio communication. While embodiments are described herein in the context of an entertainment system such as for incorporation into a vehicle, embodiments are not so limited. Embodiments herein may be used with a variety of digital radio broadcasting (DRB) formats, including digital audio broadcasting (DAB), HD radio, digital radio mondiale (DRM) and Chinese data radio (CDR), as examples.

More generally, embodiments may perform some or all demodulation operations within a tuner. As such, a downstream processing circuit to which the tuner couples may be an audio processor or a demodulator where channel and audio decoding occur, but no format demodulation occurs. In this way, embodiments enable a different partitioning of demodulator processing, such that a dedicated tuner chip may perform, at least, format demodulation. And a downstream processing circuit, whether an audio processor or demodulator, performs channel and audio decoding. And with embodiments, flexible control of output of frequency domain or time domain information from the tuner to the downstream processing circuitry is achieved, realizing partitioning flexibility between tuner and demodulator. In addition by performing format demodulation in the frequency domain in a tuner, downstream processing circuitry can be offloaded for other operations.

Figure 1:
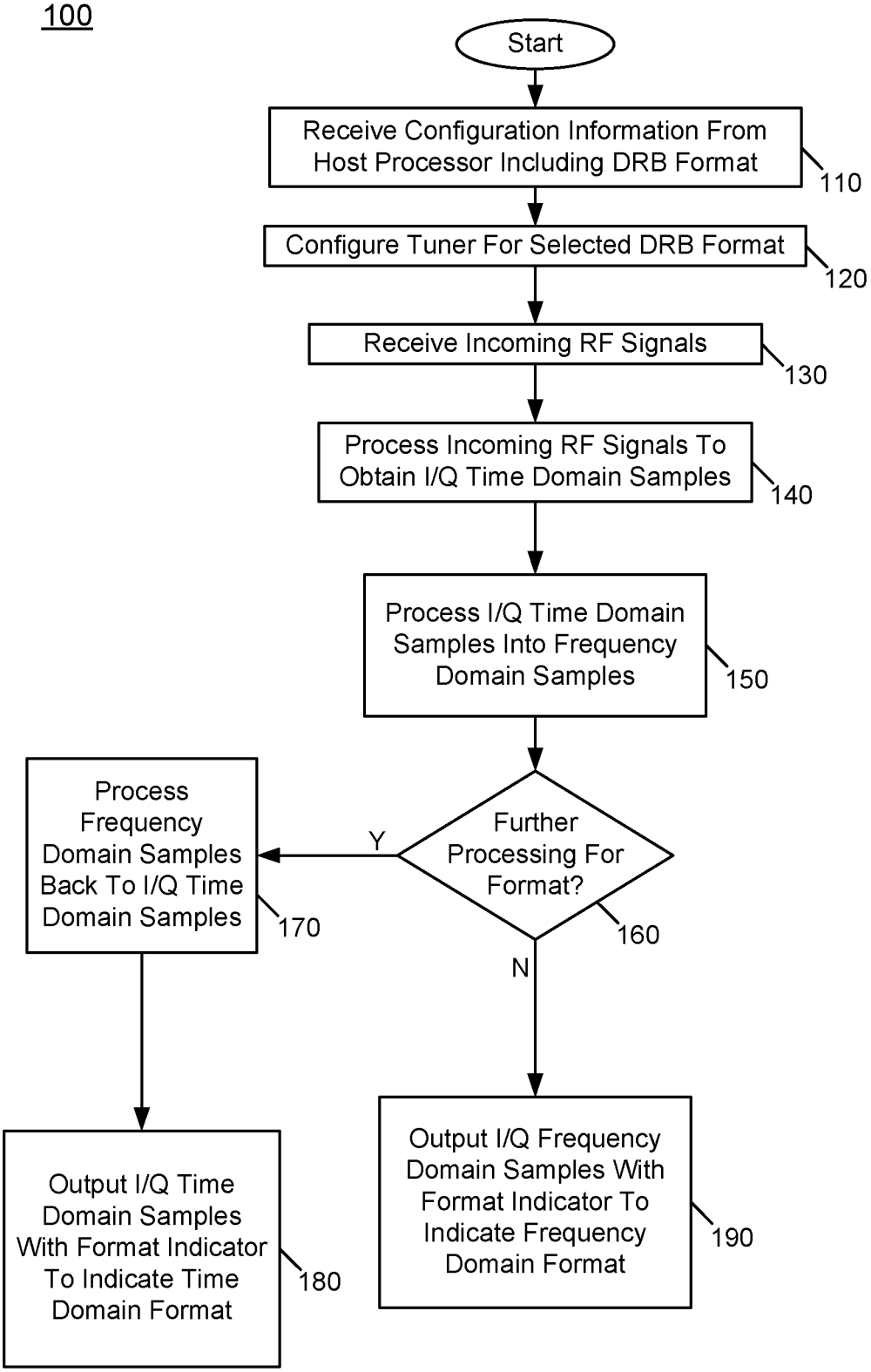
FIG. 1 is a flow diagram of a method in accordance with an embodiment.

Referring now to FIG. 1, shown is a flow diagram of a method in accordance with an embodiment. Method 100 of FIG. 1 is a method for dynamically configuring and operating a receiver of a system to handle incoming radio frequency (RF) signals of a given format. In particular embodiments, method 100 may be performed to configure a tuner and demodulator to process signals of a given digital radio broadcast format.

As seen, at block 110 configuration information is received from a host processor of a system. More particularly, this configuration information may be received in one or more tuner chips, each of which may include multiple tuners. In an embodiment, the configuration information may include broadcast format, desired channel(s) and mode of operation (such as maximal ratio combining (MRC) mode, background processing or so forth). Next at block 120 configuration operations may be performed to configure various components of the tuners appropriately for the given DRB format. For example, analog front end circuitry and digital processing circuitry may be controlled based on this information. As described herein based at least in part on the format of an incoming RF signal, a determination may be made as to the type of resulting processed signal information to be provided downstream, e.g., to a separate coprocessor chip.

In different modes of operation, which may be dependent based on capabilities of downstream processing circuitry coupled to the tuner, this processed signal information may be provided in a time domain or a frequency domain format. This is the case, since in at least certain modes of operation, time domain information recovered in the tuner may be converted to frequency domain information to perform various processing, e.g., for purposes of performing maximal rate combining. Thus depending upon the particular characteristics of a demodulator or other downstream processing circuitry, a tuner may be controlled to provide processed signal information in either of a time domain format or a frequency domain format. In embodiments herein that first convert time domain information into frequency domain information for purposes of additional processing such as MRC processing, the ability to provide such frequency processed signal information may reduce overall processing within the demodulator, which can allow additional, enhanced or otherwise upgraded operations to be performed in the demodulator.

Thus when it is determined that frequency domain information can be provided to a demodulator, additional processing in the tuner, including a re-conversion of frequency domain information back to time domain information, that would be performed when the configuration information indicates time domain signals are to be output, may be avoided. And as a result, by avoiding this additional processing, more processing capacity within processing circuitry of the tuner, e.g., in the form of MIPS, is available. This additional processing capacity may enable more accurate operations to be performed. For example, coherent format demodulation may be performed, improving accuracy, and avoiding the need for certain downstream processing.

Still with reference to FIG. 1, at this point a tuner is configured for normal operation. As such, normal receiver operation may proceed. Thus as further illustrated in FIG. 1, incoming signals may be received (block 130) and processed (block 140). More specifically, the incoming RF signals may be processed to obtain complex (I/Q) time domain samples. Such processing may include gain control operations, filtering and down conversion, e.g., to a zero intermediate frequency (ZIF), and digitization into digital samples.

Next at block 150, the I/Q time domain samples may be processed into frequency domain samples. That is, the time domain samples (which in an embodiment may have 16 bits of information) may be converted to frequency domain samples. More specifically in a particular embodiment time domain samples may be converted into 2048 sub-carriers, each of which may include 16 bits. Additional processing of these frequency domain samples may be performed. For example, synchronization and timing processing may be performed to determine timing parameters and to establish symbol boundaries and so forth. Also, a demodulation may be performed to realize format demodulated sub-carriers. Then these synchronized demodulated frequency domain sub-carriers of the separate tuners can be combined, e.g., according to a maximal ratio combining technique.

Then it may be determined at diamond 160 whether further processing is to be done for the type of DRB format. This determination, which may be made based on the received configuration information, can be used to indicate whether frequency domain information is allowed to be output from the tuner to the downstream circuitry or whether re-conversion back to time domain information is to be performed. If it is determined to perform a re-conversion, control passes to block 170 where the frequency domain samples may be processed to convert them back to I/Q time domain samples. Note that this processing may add additional content information into the signals, including cyclic redundancy information, null information and so forth. Then at block 180, these time domain samples can be output as a stream of DRB frames, with a format indicator to indicate that the provided information is in the time domain format. Details of one technique for embedding this format indicator into sample information is described below.

With further reference to FIG. 1, instead if it is determined that no further processing is appropriate for the format, namely because the downstream circuitry can handle frequency domain signals, control passes from diamond 160 to block 190, where the frequency domain information is sent, with corresponding format indicators to identify that the provided information is in the frequency domain. As such, the additional processing described above at block 170 can be avoided. And in this instance, enhanced processing within the tuner may be realized, as the need for this re-conversion is avoided. Understand while shown at this high level in the embodiment of FIG. 1, many variations and alternatives are possible.

Figure 2:
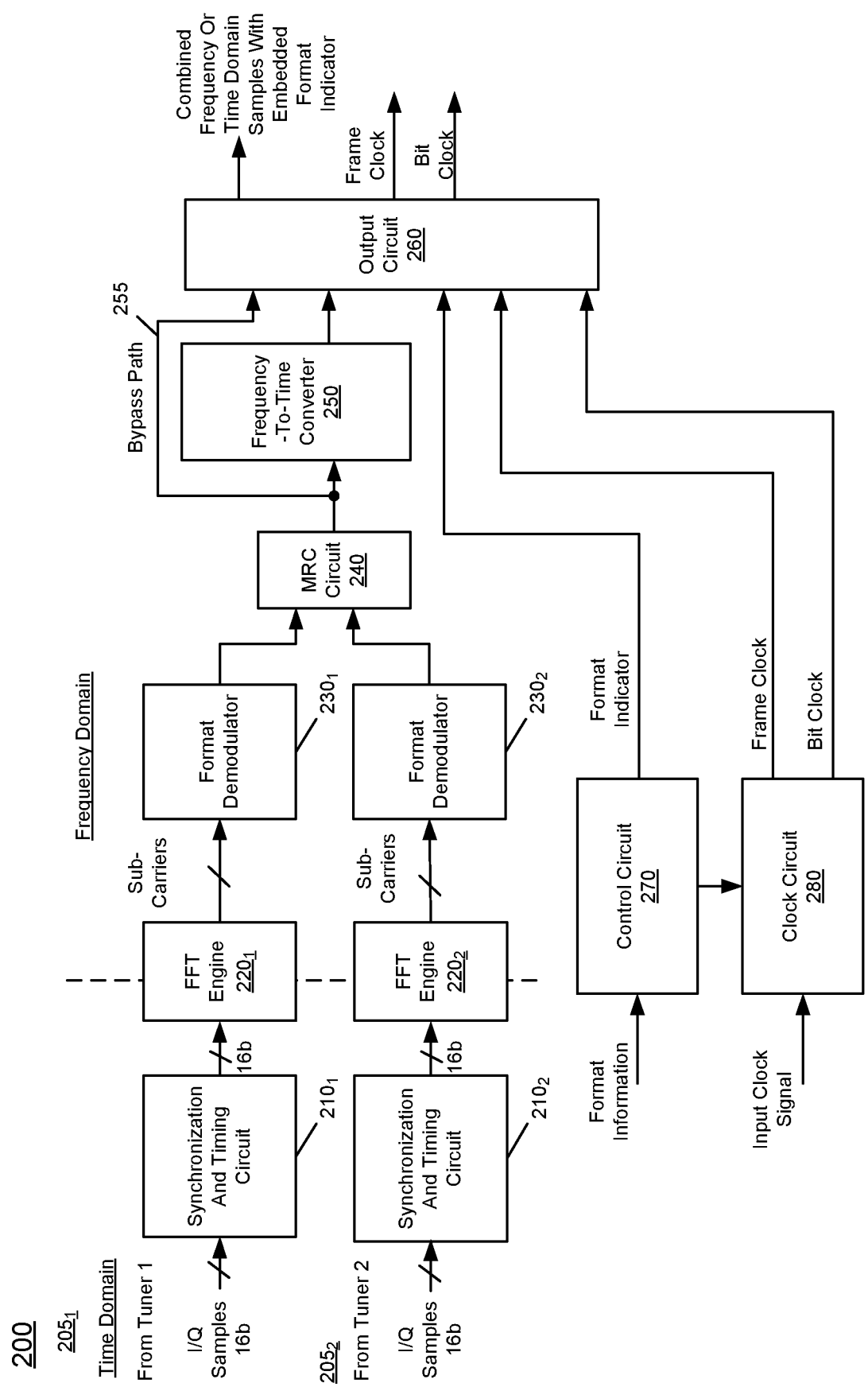
FIG. 2 is a block diagram of a tuner in accordance with an embodiment.

Referring now to FIG. 2, shown is a block diagram of a tuner in accordance with an embodiment. More specifically, tuner 200 in FIG. 2 may be implemented as an integrated circuit including at least one semiconductor die. In the particular embodiment shown, tuner 200 may include multiple independent tuners, namely a first tuner $205_1$ and a second tuner $205_2$. Note that front end circuitry of the tuner is not shown to avoid obscuring the detail shown in FIG. 2. Understand that a front end of a tuner may include various analog front end processing circuitry including, e.g., a low noise amplifier, additional gain control blocks such as an automatic gain control circuit, a mixer to down convert incoming RF signals to a lower, e.g., ZIF frequency, filtering circuitry (optionally) and digitization circuitry, such as an analog-to-digital converter. Thus as illustrated in FIG. 2, each tuner 205 provides downconverted digitized information, e.g., in the form of I/Q samples, each of which may be 16 bits.

For ease of discussion, components present in first tuner $205_1$ are described. Understand that similar components are present in tuner $205_2$. Furthermore, while 2 tuners are shown in the embodiment of FIG. 2, it is possible for a tuner to include more than 2 independent tuners.

As illustrated, incoming samples are provided to a synchronization and timing circuit $210_1$. In embodiments herein, circuit $210_1$ is configured to perform frame synchronization, sampling rate determination and frequency offset processing, such that synchronized samples are output to a fast Fourier transform (FFT) engine $220_1$. In embodiments herein FFT engine $220_1$ is configured to convert the incoming time domain samples into frequency domain samples. In a particular embodiment, FFT engine $220_1$ may be configured to convert time domain samples into 2048 sub-carrier payloads. In turn, the sub-carriers are provided to a format demodulator $230_1$.

In a mode in which no re-conversion back to time domain information occurs, format demodulator $230_1$ can perform a higher level of format demodulation. For example, with available MIPS it is possible to perform a coherent demodulation, rather than a non-coherent demodulation. In this way, improved demodulation accuracy can be realized, increasing signal-to-noise ratios by, e.g., 2-3 dB. Such coherent format demodulation may include performing channel estimation, including noise and impulse response determinations, as well as compensating for such channel degradation.

With further reference to FIG. 2, the resulting demodulated sub-carriers of each of tuner 205 is provided to an MRC circuit 240. In various embodiments, MRC circuit 240 may combine the sub-carriers according to a given weighting scheme. For example, in one embodiment the weighting may be based on SNR information. Of course the signals may be combined in another manner.

Still referring to FIG. 2, depending upon configuration of tuner 200 these processed frequency domain signals may be provided directly to an output circuit 260 via a bypass path 255 when it is determined that frequency domain information may be directly output from tuner 200. Instead when it is determined that time domain information is to be output from the tuner, the combined signal information is provided to a frequency-to-time converter 250, which performs various processing to re-convert the frequency domain information back to time domain information.

A control circuit 270 determines output format and controls various circuitry of tuner 200 to output information in a time domain or frequency domain manner. As illustrated in FIG. 2, control circuit 270 receives format information, e.g., in the form of configuration information from a host processor, and based at least in part on this information, determines an appropriate type of information to be output. To this end, control circuit 270 may send various control signals (not shown for ease of illustration in FIG. 2) to the circuitry of FIG. 2 to configure it for appropriate processing and sending of information. In addition, control circuit 270 may generate a format indicator, e.g., a single-bit value to identify that outgoing information is in either a time domain format or a frequency domain format. As shown, this format indicator is provided to output circuit 260.

Output circuit 260 may embed this format indicator in each sample of processed information output. Output circuit 260 further may be configured to output a frame clock and a bit clock, both of which are received from a clock circuit 280, which may generate these values based on an input clock signal and, e.g., synchronization information regarding frame synchronization. Thus in the embodiment of FIG. 2, output circuit 260 outputs signal information in either a time domain format or a frequency domain format, along with an embedded format indicator. Note that in an embodiment, separate signal lines (coupled to separate pins) may be provided to output I and Q information. In addition, separate signal lines may be provided to output the frame clock and the bit clock. Understand while shown at this high level in FIG. 2, many variations and alternatives are possible. For example, while particular hardware circuitry is shown in FIG. 2, understand that embodiments are not limited in this regard, and in some implementations the various operations may be performed in general-purpose processing circuitry that may execute firmware, software, and/or combinations thereof. As an example, in some cases at least a portion of the radio processing described in FIG. 2 may be performed by a general-purpose processor such as a DSP or other programmable processing circuit that executes firmware instructions to perform the operations as described herein. To this end, embodiments may include instructions that are stored in a non-transitory storage medium. Such storage medium may be implemented within tuner 200 itself such as an internal non-volatile memory or an external memory such as an external flash memory of a system incorporating tuner 200.

Referring now to FIG. 3, shown is a block diagram of a data frame in accordance with an embodiment. More specifically, FIG. 3 shows a frame 300 of a DAB format, which is one representative DRB format that may leverage embodiments. Understand of course that data frames may take other forms in different embodiments. As illustrated a data frame 300 may be approximately 96 milliseconds (ms) and is formed of a null portion 310, a transmitted frame phase reference (TFPR) portion 320, a fast information channel (FIC) portion 325 and a data symbol portion 330. In an embodiment, null portion 310 may be approximately 1.304 ms and may include, e.g., 2664 samples. TFPR portion 320 may be approximately 1.246 ms and may include 2552 samples, at 2048 kHz. FIC portion 325 may be approximately 3.738 ms. In turn, data portion 330 may include a plurality of data symbols, e.g., 72 data symbols each of which is approximately 1.246 ms. In an embodiment, each data symbol may include a cyclic prefix and a plurality of sub-carriers, e.g., 2048 sub-carriers in a total of 2552 samples.

And more particularly in embodiments a useful payload portion may be formed of 1536 post-FFT data samples, where the reduced number of samples comes from the removal of the cyclic prefix and discarding non-data sub-carriers. Rather than sending all 2048 frequency coefficients, in some cases 1536 frequency coefficients can be sent. This is the case since in modes in which frequency domain information is provided, there are reduced data needs because this frequency domain information is already time synchronized and format demodulated. As such, fewer bits can be sent. And a downstream demodulator can avoid certain processing, which has already been performed in the tuner, including channel estimation and so forth.

Note that in some embodiments, additional metadata may be provided in the remaining payload portion of the data samples. For example, it is possible to provide various signal metric information and/or AGC information to the downstream demodulator. Note that in the frequency domain mode of operation, there is no timing or carrier recovery to be done downstream as this processing has already been performed in the tuner. As such, a downstream demodulator may simply perform channel decoding (e.g., Viterbi decoding), audio/data demultiplexing, and audio decoding/presentation. Thus the downstream demodulator may be simplified.

As described above, it is possible in particular modes that frequency domain information may be re-converted back to time domain information before being output from a tuner. Additional MIPS are consumed by this processing. The tuner may be controllably configured to enable additional signal processing circuitry such as the frequency-to-time domain converter of FIG. 2 to perform this conversion.

Referring now to FIG. 4, shown is a block diagram of a converter in accordance with an embodiment. As shown in FIG. 4, converter 400 is configured to perform a re-conversion of frequency domain information back to time domain information. As seen, converter 400 may receive incoming combined frequency domain signal information from an MRC circuit 410. This information is processed in a differential encoder 420, and the resulting encoded information is provided to an inverse fast Fourier transform (IFFT) engine 430, which may take the sub-carriers and convert them back to time domain information (e.g., 16 bits of I and Q information).

As seen, this time domain information is provided to a cyclic prefix generator 460 which may, based on the signal information, generate a cyclic prefix for appending to a beginning of a data symbol. As further illustrated in FIG. 4, a TFPR generator 450 is present and used to generate a TFPR portion of a data frame. In addition, a null generator 440 is configured to generate a null portion of a data frame. As seen, each of these components is coupled to a combiner 470, which may be implemented as a frame generator to output time domain frames such as shown in FIG. 3. Understand while shown at this high level in FIG. 4, many variations and alternatives are possible.

Figure 5:
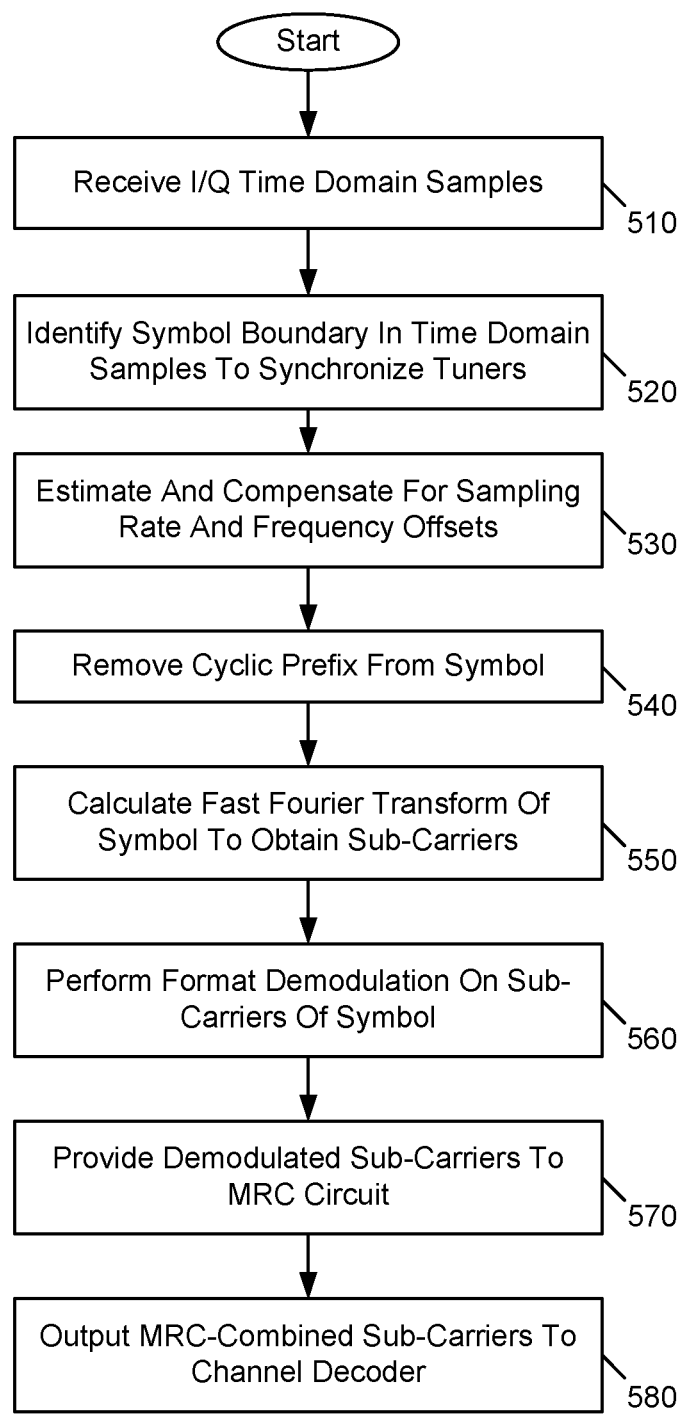
FIG. 5 is a flow diagram of a method in accordance with another embodiment.

Referring now to FIG. 5, shown is a flow diagram of a method in accordance with another embodiment. More specifically, method 500 is a method for performing format demodulation operations in a tuner. As seen, method 500 begins by receiving I/Q time domain samples (block 510). The information may be received in a synchronizer that, based on the samples, can identify a symbol boundary to enable multiple tuners to be synchronized (block 520). Next additional processing of the samples may occur. More specifically a sampling rate and frequency offsets may be estimated and compensation may be performed (block 530). At block 540 a cyclic prefix may be removed from each data symbol.

Then frequency domain processing may be performed which, as shown in block 550, includes calculating an FFT of a given symbol to obtain multiple sub-carriers. In addition a symbol number may be provided for each symbol (e.g., 0 to 75 for DAB) to enable a channel decoder to properly decode the data. Still referring to FIG. 5, next at block 560 format demodulation may be performed on the sub-carriers of the symbol. In a mode in which frequency domain information is to be output, a coherent format demodulation may be performed. Such coherent format demodulation may include channel estimation and correction, reducing downstream processing needs. At block 570 the demodulated sub-carriers may be provided to an MRC circuit, where they are combined with synchronized information of another tuner. In a mode in which frequency domain information is directly output to a demodulator, control passes to block 580 where MRC combined demodulated sub-carriers may be output to a channel decoder, which may be located in downstream processing circuitry, e.g., another IC coupled to the tuner IC. Understand while shown at this high level in the embodiment of FIG. 5, many variations and alternatives are possible.

Figure 6:
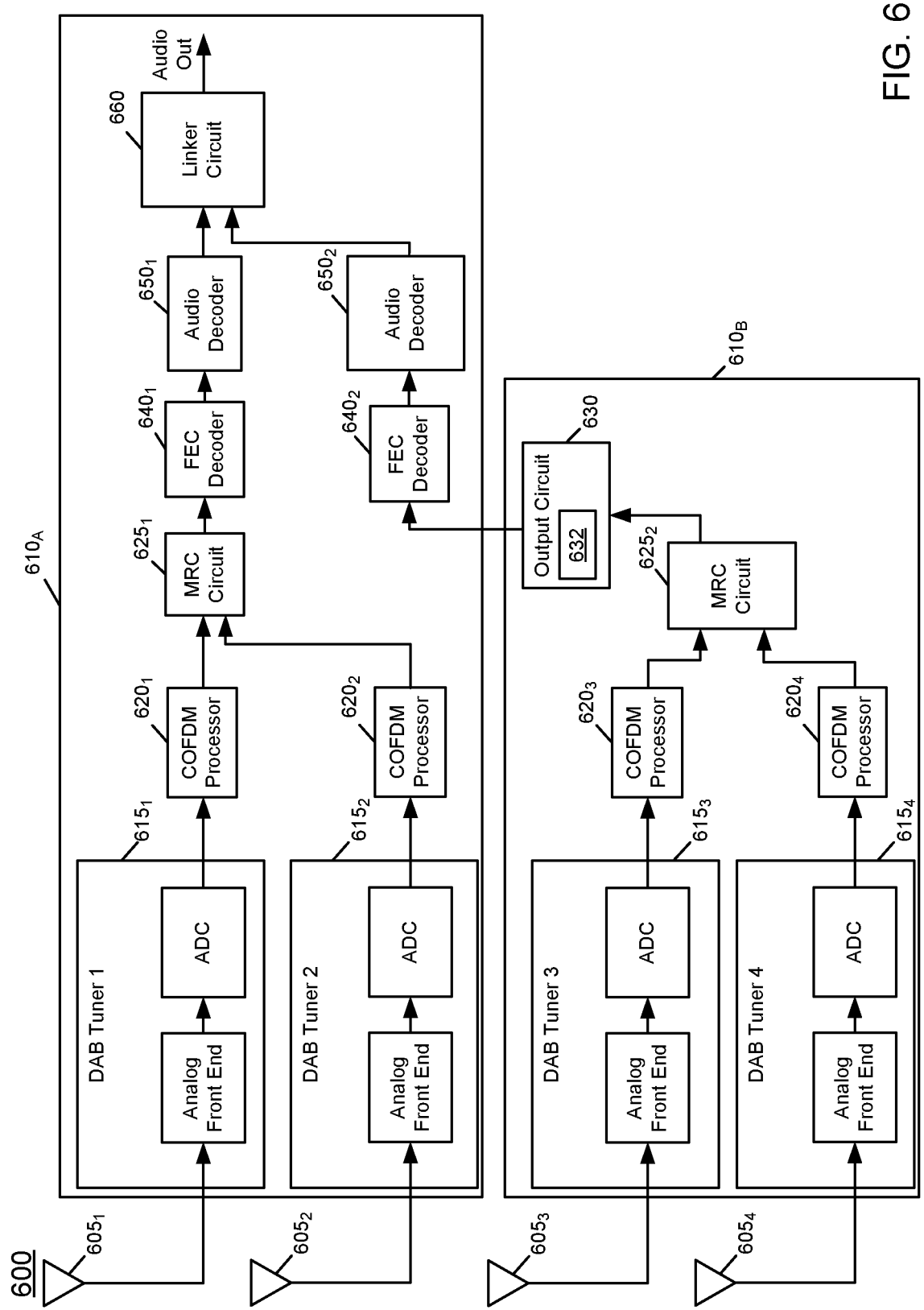
FIG. 6 is a block diagram of a system in accordance with an embodiment.

Referring now to FIG. 6, shown is a block diagram of a system in accordance with an embodiment. As shown in FIG. 6, system 600 is at least a portion of an entertainment system, such as a vehicle infotainment system for reception, processing and output of radio signals. As illustrated in FIG. 6, system 600 includes multiple separate integrated circuits $610_A$, $610_B$. In an embodiment, at least IC $610_B$ may implement an embodiment to control an output of time domain or frequency domain information, depending upon a mode of operation. In general, IC $610_A$ may be a combined tuner and demodulator chip, while IC $610_E$ may be a tuner only chip. However, in embodiments herein at least some demodulation operations may be performed within IC $610_B$, to enable frequency domain information to be communicated to first IC $610_A$, reducing processing needs in that chip.

With further reference to first IC $610_A$, multiple tuners $615_{1,2}$ are present, each of which is configured to receive incoming RF signals from corresponding antennas 605. As illustrated, each tuner 615 may be configured for RF processing and may include analog front end circuitry and a corresponding ADC. In turn, each tuner 615 couples to a coded orthogonal frequency domain multiplexing (COFDM) processor $620_{1,2}$ each of which may perform various processing and conversion of time domain information into frequency domain information, such that corresponding synchronized sub-carriers from each of these circuits can be combined in a MRC circuit $625_1$. Depending upon implementation, note that the combined signal information output from MRC circuit 625 may be output in frequency domain or time domain.

As further illustrated in FIG. 6, first IC $610_A$ also includes decoding circuitry, including a forward error correction decoder $640_1$ which may perform channel decoding, e.g., according to a Viterbi decoding technique. In addition, this circuitry may perform demultiplexing such that text/picture information may be separated from audio information and sent off-chip, e.g., to a host processor. In turn the resulting channel decoded audio information is provided to an audio decoder $650_1$ for audio processing. Thereafter, decoded audio information is sent to a linker circuit 660, which may perform seamless linking to controllably output audio information from one or both signal processing paths.

As further illustrated in FIG. 6, second IC $610_B$ similarly may include multiple tuners $615_3$-$615_4$ to process incoming RF signals received from antennas $605_3$-$605_4$. The resulting digitized time domain signal information is provided to COFDM processors $620_3$, and $620_4$ where frequency domain processing can be performed as described herein. Resulting sub-carriers are sent to a corresponding MRC circuit $625_2$. The combined signal information is output to an output circuit 630 which may controllably output frequency domain or time domain information based on control information received from, e.g., a host processor. If a time domain mode is indicated, output circuit 630 may convert received frequency domain information into time domain information within a converter 632. As such, output circuit 630 outputs either time domain or frequency domain information to another FEC circuit $640_2$ of first IC $610_A$. Understand that individual samples may include a format indicator, embedded with the signal information in output circuit 630.

Note that while first IC $610_A$ may be referred to as a combined tuner and demodulator, understand that much of the demodulation operations can be performed within tuners incorporating embodiments, such as tuner $610_B$. As a result, back end processing performed in first IC $610_A$ is decoding, rather than demodulation operations.

Figure 7:
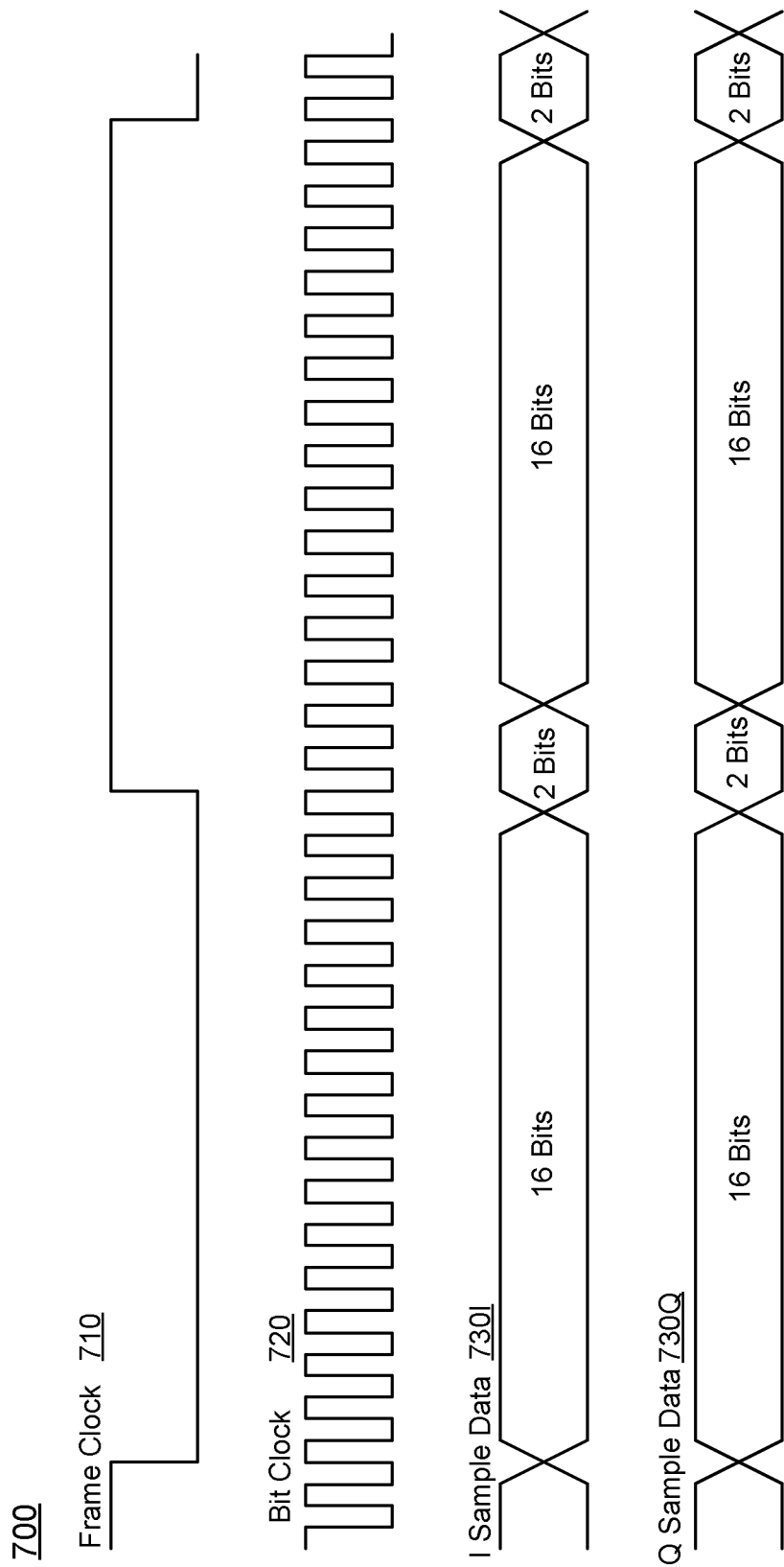
FIG. 7 is a timing diagram of signal communication in accordance with an embodiment.

Referring now to FIG. 7, shown is a timing diagram illustrating information communicated on a 4-line interface which may couple between a tuner and a downstream processing circuit. As shown in FIG. 7, diagram 700 includes 4 lines of information, namely a frame clock 710, a bit clock 720, I sample data 730I and Q sample data 730Q. In an embodiment, frame clock 710 defines the valid periods for I/Q data samples, and may be set to 1024 kHz. Bit clock 720 may define the resolution of I/Q data samples, and may be set to 38.864 MHz, to avoid generation of harmonics (spurs) that would land inside radio bands such as DAB and FM bands. As illustrated with regard to I sample data 730I, 16-bit I/Q data may be MSB aligned to an 18-bit slot size. As such two available bits may be used to provide format information, by way of a format indicator. In one embodiment, for time domain data transfer, these two LSB bits may be set to 0 to indicate a time domain format. In turn for frequency domain data transfer, the LSB can be set to one to indicate a frequency domain format. In embodiments, a tuner may set the LSB+1 bit to a value of one to indicate the very first symbol of that DAB/DAB+ frame, such that downstream circuitry does not perform DAB frame synchronization.

I/Q sample data 730 are sent during both low and high periods of the frame cycle of frame clock 710, to achieve a communication rate of 2048 kS/s. Note further that the 18-bit I/Q sample data slots 730 are delayed one bit-clock cycle from the frame clock transitions. In cases where additional metadata is desired to be sent from tuner to downstream processing circuitry, embodiments may modify the communication, while still preserving a base clock rate of 36.864 MHz. For example, a tuner may be configured to send FFT coefficients for 1536 DAB/DAB+ sub-carriers (instead of 2048 FFT points). In turn, the bit slot size may be increased to 24 bits, to provide for 8-bit use per slot for extended metadata, such as SNR information, AGC information or so forth.

In another format, e.g., HD radio, I/Q data may be set at 744 kS/s. Understand although shown with this particular implementation in FIG. 7, many variations are possible. For example, it is possible for the I/Q data to consume less than 16 bits, such that additional metadata information may be communicated in each of the data samples.

Figure 8:
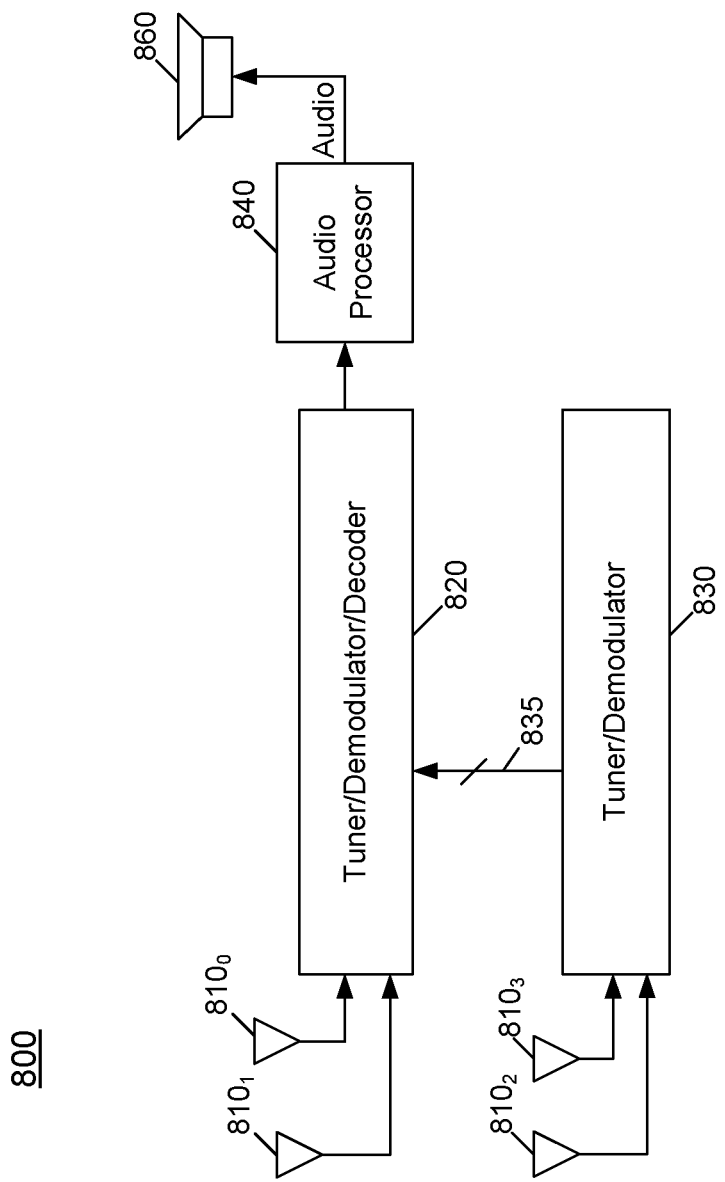
FIG. 8 is a block diagram of a receiver in accordance with an embodiment.

Referring now to FIG. 8, shown is a block diagram of a receiver in accordance with an embodiment. As illustrated in FIG. 8, receiver 800 is a multi-tuner receiver. Such receiver may be incorporated into a vehicle infotainment system, and is configured to receive incoming RF signals from multiple antennas 810$_0$-810$_3$. As shown, each of a pair of antennas 810 provides RF signals to a tuner/demodulator/decoder 820 and a tuner/demodulator 830. In embodiments herein, each of these components may be a separate integrated circuit that may incorporate embodiments as described herein. To this end, tuner/demodulator 830 may receive and process the incoming RF signals into I/Q data that may be in a time domain format or a frequency domain format depending upon mode of operation. For purposes of discussion, assume that tuner/demodulator 830 is configured to output frequency domain information to tuner/demodulator/decoder 820. As such, this frequency domain information may be sent with embedded format indicators to indicate a frequency domain format. In the embodiment shown, tuner/demodulator 830 may couple to tuner/demodulator/decoder 820 via a suitable interconnect 835 which, in one embodiment may be a four signal line interconnect to carry a frame clock, a bit clock, and I and Q data on separate signal lines, such as described above with regard to FIG. 7.

In turn, tuner/demodulator/decoder 820 is configured to receive incoming RF signals from antennas 810$_{0,1}$ and process these signals. Here, the processing includes demodulation and decoding operations, both for the signals received directly in tuner/demodulator/decoder 820 as well as performing decoding for the frequency domain information received from tuner/demodulator 830. After such processing, tuner/demodulator/decoder 820 outputs one or more audio streams to an audio processor 850. In turn, audio processor 850 may perform various audio processing on one or more of these streams. For example, audio processor 850 may perform a blending operation and/or a handover operation to flexibly control audio output based on, e.g., signal metrics. As further shown in FIG. 8, the audio signal may be output to an output device 860, such as a set of speakers, e.g., within a vehicle. Although shown at this high level in the embodiment of FIG. 8, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first tuner comprising:
      a first analog front end circuit to receive a radio frequency (RF) signal and downconvert the RF signal to a first lower frequency signal;
      a first digitizer to digitize the first lower frequency signal into a first digitized first lower frequency signal;
      a first fast Fourier transform (FFT) engine to compute a first plurality of frequency domain sub-carriers from the first digitized first lower frequency signal; and
      a first format demodulator to demodulate the first plurality of frequency domain sub-carriers;
   a second tuner comprising:
      a second analog front end circuit to receive the RF signal and downconvert the RF signal to a second lower frequency signal;
      a second digitizer to digitize the second lower frequency signal into a second digitized second lower frequency signal;
      a second FFT engine to compute a second plurality of frequency domain sub-carriers from the second digitized second lower frequency signal; and
      a second format demodulator to demodulate the second plurality of frequency domain sub-carriers;
   a combiner circuit to combine the first plurality of demodulated frequency domain sub-carriers and the second plurality of demodulated frequency domain sub-carriers into a plurality of combined frequency domain sub-carriers; and
   an output circuit coupled to the combiner circuit, wherein in a first mode, the output circuit is to embed a format indicator with each of the plurality of combined frequency domain sub-carriers to indicate a frequency domain format, and to output the plurality of combined frequency domain sub-carriers with the embedded format indicator to a downstream processing circuit for channel decoding.

2. The apparatus of claim 1, further comprising a control circuit to control the output circuit to operate in the first mode and to operate in a second mode in which time domain signal information is sent to the downstream processing circuit.

3. The apparatus of claim 2, wherein the control circuit is to control the output circuit to operate in one of the first mode and the second mode based on format information received from a host processor.

4. The apparatus of claim 2, further comprising a frequency-to-time converter coupled to the combiner circuit, wherein in the second mode, the frequency-to-time converter is to convert the plurality of combined frequency domain sub-carriers into a plurality of combined time domain samples and provide the plurality of combined time domain samples to the output circuit.

5. The apparatus of claim 4, wherein when the control circuit is to control the output circuit to operate in the first mode, the control circuit is to disable the frequency-to-time converter.

6. The apparatus of claim 2, wherein in the first mode, the first format demodulator is to coherently demodulate the first plurality of frequency domain sub-carriers, and in the second mode the first format demodulator is to non-coherently demodulate the first plurality of frequency domain sub-carriers.

7. The apparatus of claim 2, wherein the first tuner comprises an interface to couple to the downstream processing circuit, the interface having a plurality of lines including:
   a first line to communicate a frame clock;
   a second line to communicate a bit clock;
   a third line to communicate first complex information with the embedded format indicator; and
   a fourth line to communicate second complex information with the embedded format indicator.

8. The apparatus of claim 7, wherein in the first mode the third line is to communicate the first complex information in the frequency domain and in the second mode the third line is to communicate the first complex information in the time domain.

9. The apparatus of claim 1, further comprising a bypass path coupled between the combiner circuit and the output circuit, wherein in the first mode, the bypass path is to provide the plurality of combined frequency domain sub-carriers to the output circuit.

10. The apparatus of claim 1, wherein the first tuner further comprises a first synchronizer to synchronize the first digitized first lower frequency signal and provide the synchronized first digitized first lower frequency signal to the first FFT engine.

11. The apparatus of claim 1, wherein the output circuit is further to embed metadata associated with the RF signal into the plurality of combined frequency domain sub-carriers, the metadata comprising signal metric information regarding the RF signal.

12. A non-transitory computer readable medium comprising instructions that when executed enable a system to perform a method comprising:
in response to configuration information from a host processor for processing an incoming radio frequency (RF) signal of a first digital radio broadcast (DRB) format, configuring a multi-tuner integrated circuit (IC) for a first mode of operation in which the multi-tuner IC is to output frequency domain information to a coprocessor coupled to the multi-tuner IC;
receiving, in a first tuner of the multi-tuner IC, the incoming RF signal and processing the incoming RF signal into first frequency domain sample information comprising demodulated first frequency domain sub-carriers;
receiving, in a second tuner of the multi-tuner IC, the incoming RF signal and processing the incoming RF signal into second frequency domain sample information comprising demodulated second frequency domain sub-carriers;
thereafter combining the first frequency domain sample information and the second frequency domain sample information into combined frequency domain sample information;
embedding a format indicator into each of a plurality of sub-carriers of the combined frequency domain sample information to indicate a frequency domain format; and
outputting the plurality of sub-carriers of the combined frequency domain sample information having the embedded format indicator from the multi-tuner IC to the coprocessor.

13. The non-transitory computer readable medium of claim 12, wherein the method further comprises, in the first mode of operation, disabling a frequency-to-time converter of the multi-tuner IC.

14. The non-transitory computer readable medium of claim 13, wherein the method further comprises, in a second mode of operation, enabling the frequency-to-time converter and converting the plurality of sub-carriers of the combined frequency domain sample information into a plurality of time domain samples.

15. The non-transitory computer readable medium of claim 14, wherein the method further comprises:
embedding another format indicator into the plurality of time domain samples to indicate a time domain format; and
outputting the plurality of time domain samples having the embedded another format indicator from the multi-tuner IC to the coprocessor.

16. The non-transitory computer readable medium of claim 12, wherein processing the incoming RF signal into the first frequency domain sample information comprises performing coherent demodulation to obtain the demodulated first frequency domain sub-carriers and the second frequency domain sub-carriers.

17. The non-transitory computer readable medium of claim 12, wherein the method further comprises embedding signal metric information regarding the incoming RF signal into at least some of the plurality of sub-carriers of the combined frequency domain sample information.

18. A system comprising:
a first integrated circuit comprising a plurality of tuners to receive, downconvert and digitize an incoming radio frequency (RF) signal into a first plurality of digital signals, demodulation circuitry to format demodulate the first plurality of digital signals, a first combiner to combine the format demodulated first plurality of digital signals into a first combined digital signal, and an output circuit to output the first combined digital signal in a frequency domain in a first mode and to output the first combined digital signal in a time domain in a second mode;
a second integrated circuit coupled to the first integrated circuit, the second integrated circuit comprising a second plurality of tuners to receive, downconvert and digitize the incoming RF signal into a second plurality of digital signals, second demodulation circuitry to format demodulate the second plurality of digital signals, a second combiner to combine the format demodulated second plurality of digital signals into a second combined digital signal and a decoder to decode the first combined digital signal and to output decoded audio information to a host processor coupled to the second integrated circuit, wherein the decoder is to decode the second combined digital signal into second decoded audio information, the second integrated circuit further comprising a linker circuit to seamlessly link the decoded audio information and the second decoded audio information and output the seamlessly linked decoded audio information to the host processor; and
the host processor coupled to the second integrated circuit.

* * * * *